United States Patent [19]

Bendler et al.

[11] 4,188,856

[45] Feb. 19, 1980

[54] COMPRESSED-GAS-ACTUATED SWITCHING DEVICE

[75] Inventors: Hellmut Bendler; Gerrit Scheiderer, both of Fürth, Fed. Rep. of Germany

[73] Assignee: Dynamit Nobel AG, Fed. Rep. of Germany

[21] Appl. No.: 869,489

[22] Filed: Jan. 16, 1978

[30] Foreign Application Priority Data

Jan. 19, 1977 [DE] Fed. Rep. of Germany ....... 2701935

[51] Int. Cl.² .................. F42C 15/00; A62C 35/02
[52] U.S. Cl. ............................. 89/1 B; 169/28
[58] Field of Search .............. 89/1 B, 1 R; 102/260, 102/261; 169/57, 60, 19, 28

[56] References Cited

U.S. PATENT DOCUMENTS

| | | | |
|---|---|---|---|
| 2,143,132 | 1/1939 | Salmond | 169/28 |
| 2,382,872 | 8/1945 | Giles | 102/261 |
| 2,717,042 | 9/1955 | Grant et al. | 89/1 B X |
| 2,766,832 | 10/1956 | Mathisen | 169/28 X |
| 3,754,602 | 8/1973 | Magdars | 169/60 |
| 3,762,479 | 10/1973 | Fike et al. | 169/28 |
| 3,811,511 | 5/1974 | McCulloch | 169/28 |
| 3,853,180 | 12/1974 | Harris et al. | 169/28 |
| 4,004,488 | 1/1977 | Williams | 102/261 X |
| 4,038,924 | 8/1977 | Beermann et al. | 89/1 B X |

FOREIGN PATENT DOCUMENTS

| | | | |
|---|---|---|---|
| 1172543 | 1/1954 | Fed. Rep. of Germany | 169/28 |
| 1347489 | 2/1974 | United Kingdom | 169/28 |

*Primary Examiner*—David H. Brown
*Attorney, Agent, or Firm*—Craig and Antonelli

[57] ABSTRACT

A compressed-gas-actuated switching device including a housing, at least one primer for generating compressed gas and an actuating element for actuating a device to be actuated in response to generated compressed gas. The switching device further includes a mechanical triggering arrangement in combination with at least one of an electrical and a thermal triggering arrangement for initiating the at least one primer element.

25 Claims, 4 Drawing Figures

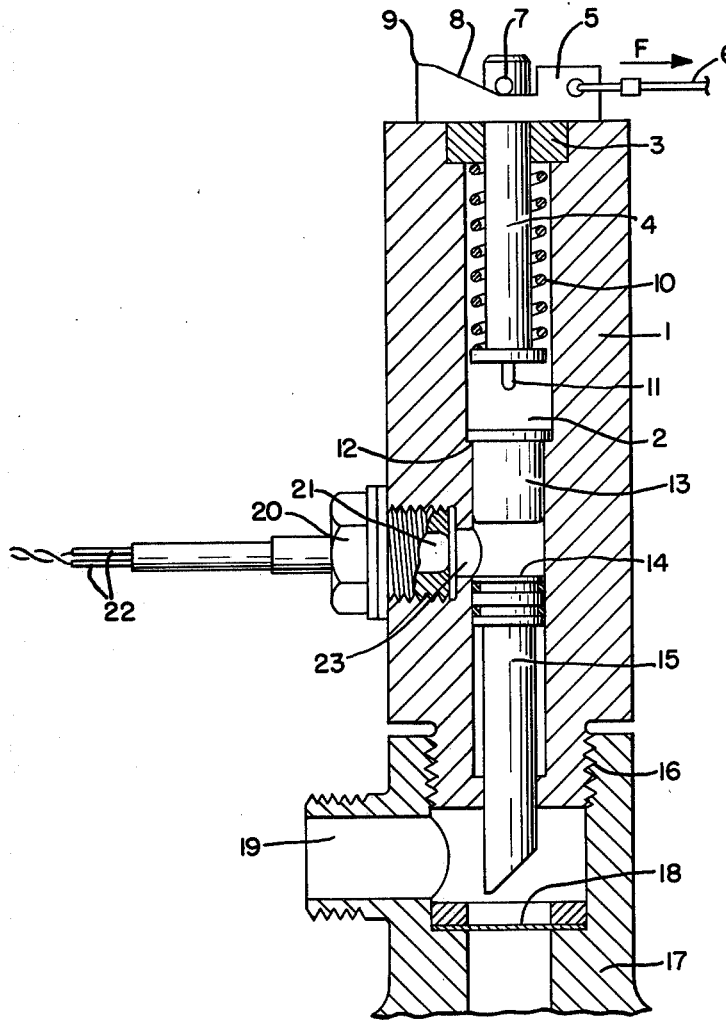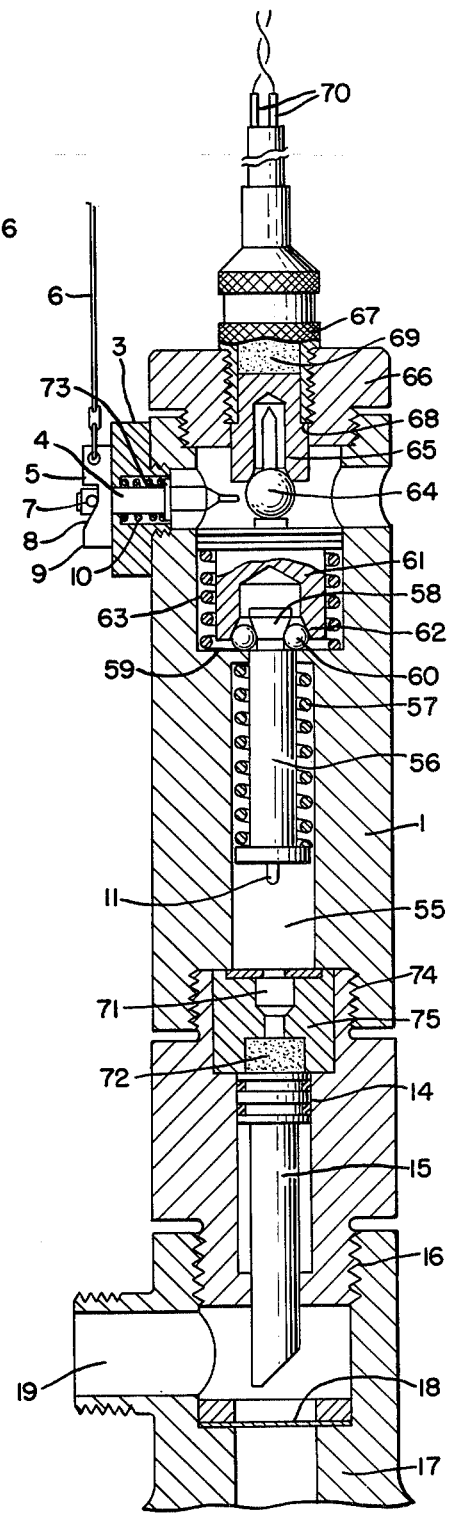
FIG. 1.
FIG. 4.

COMPRESSED-GAS-ACTUATED SWITCHING DEVICE

The present invention relates to a compressed-gas-actuated switching element including a housing, a primer element and an actuating element which is displaceable within the housing under the effect of compressed gas, which element has the shape of a bolt, pin, plunger, piston, or the like.

Such a switching element has been described, for example, in German Patent 1,646,335, according to which the pin- or piston-like actuating element is retracted into or pushed out from a housing under the effect of a pyrotechnical mixture, a delay charge, or the like, which is ignited electrically. Such devices, also called actuators or power elements, can be utilized, for example, for release purposes, perhaps to release individual components of aircraft, for the initiation of electric switching processes in alarm or fire protection mechanisms, or for the execution of other switching or control operations.

It is known for fire extinguishing purposes to open a pressure bottle, filled with an extinguishing agent, such as "Halon", for example, and sealed by means of a metallic diaphragm, by actuating a plunger penetrating the diaphragm. The plunger is driven through the diaphragm either by manual or spring force or by means of an electrically releasable cartridge which produces compressed gas. This switching element, i.e., the plunger with its housing, etc., thus is designed only for a quite specific triggering principle.

It is advantageous, however, to have available a compressed-gas-actuated switching element combining different triggering principles to serve for many fields of application. In particular, such a switching element should be releasable mechanically by hand, but should also be additionally operable electrically or thermally or even by means of all three ways together. The mechanical triggering action ensures that even if the electric energy supply should fail, there is still possible an intentional triggering process and independently of a possible thermal triggering caused by an elevated temperature in the surroundings. Such an arrangement is advantageous, for example, for extinguishing devices installed in ship's engines or automotive engines, such as those of racing cars, so as to enable initiation of these extinguishing devices electrically or, if necessary, even mechanically by hand.

It is therefore an object of the present invention to provide a compressed-gas-actuated switching element of the type described hereinabove which will flawlessly satisfy the aforementioned requirements even over rather long periods of time, for example, 10 years and more, and which can be utilized with maximum versatility.

It is another object of the present invention to provide a switching element which is of a maximally simple construction and which is insensitive to adverse environmental conditions.

In accordance with the present invention, a compressed-gas-actuated switching element is provided which includes a mechanical triggering arrangement in combination with an electrical and/or a thermal triggering arrangement. The combined switching element of the present invention, which is a device to be activated pyrotechnically, is distinguished in that the mechanical trigger is combined with the electrical and/or thermal triggering arrangement in a single housing, so that a component is obtained which has a simple structure and is compact and rugged. In this integrated switching element, the mechanical release is always present. The question of whether the two other release possibilities or also only one thereof are or is to be additionally provided depends on the requirements of an individual case.

The mechanical initiation can be effected, for example, by means of a friction primer wherein a rip wire is pulled through a friction primer cap. Such a friction primer with automatic sealing of the outlet opening of the rip wire is described, for example, in German Patent 1,250,319. Another possibility resides in providing a percussion or striking primer element and to release the striker pin or the corresponding striker needle, initially under the action of a biased coil spring, by means of a rope pulley or the like, so that the striker pin or the striker needle impinges on the primer element and effects the mechanical triggering of the latter. In this connection, the percussion-sensitive primer means with striker pin is preferred to avoid the additional sealing measures necessary in case of a broaching-type primer so as to prevent an undesired efflux of the pressure gases from the housing of the switching element.

The biased spring element for the trigger member of the primer element, the striker pin, or the striker needle is apt to weaken in its effectiveness due to material fatigue, especially over longer periods of time. In these cases, it is more advantageous to arrange the spring of the trigger member unbiased or—to avoid uncontrolled displacements—in any event with an extremely weak bias in the housing. Only upon triggering of the function is the spring then tensioned by traction with the aid of a rope, a wire, or the like, at the trigger member to the extent required for a flawless triggering action. The traction device is suitably provided in this connection with a predetermined breaking zone ensuring the maintenance of a preset biasing force.

In accordance with an embodiment of the invention, however, there is provided an arrangement wherein the trigger member is guided within the housing and is provided with an associated spring and a tensioning wedge. The tensioning wedge cooperates with one end of the trigger member so that, upon a movement of the tensioning wedge in a transverse direction with respect to the trigger member, the latter is increasingly pulled out of its guidance while causing the spring to be compressed and, with a continuing movement of the tensioning wedge, is finally released so that it recoils and, with its other end, effects the mechanical triggering action. Here again, the spring associated with the trigger member is practically unbiased in the rest condition of the switching element, i.e., until the function is triggered, so that it is not subject to undesired aging phenomena. The defined biasing upon triggering of the function is reliably ensured by the construction of the tensioning wedge. Preferably, the tensioning wedge is moved transversely or perpendicularly to the trigger member while the trigger member moves in a vertical direction. Another advantage is that, with the same biasing force, the power required for shifting the tensioning wedge is much lower than the force which must be expended in case of a traction device directly engaging the trigger member. Thus, the tensioning wedge considerably facilitates the mechanical initiation and consequently can be shifted directly by hand. However, it is advantageous also in this arrangement to provide the tensioning wedge, for example, with a rope, a wire, or a Bowden cable, thus providing the opportunity, in case of an appropriate length of the traction device, to effect the mechanical triggering by remote control.

The cooperation of the tensioning wedge and the outer end of the trigger member can be such, for example, that the tensioning wedge encompasses in the manner of a fork the trigger member, which latter is equipped with a laterally projecting radial pin. To maintain the manufacturing expenditure and the masses to be moved during the initiation of the function at a minimum, and thus to increase the initiating speed without increasing the expended power, the end of the trigger member is provided with a longitudinal slot cooperating with the tensioning wedge which is displaceably arranged therein and is supported on the trigger member with a surface facing away from the other end of the trigger member. The tensioning wedge is guided flush in a longitudinal slot of the outer end of the trigger member and, for this purpose, the end of the trigger member is preferably slotted in the manner of a fork and provided with a radial pin bridging the slot. The tensioning wedge contacts this pin under force, preferably with its wedge-shaped inclined surface.

In many cases, it is expedient for manufacturing and assembly reasons, as well as with a view toward a repeated usage of the switching element, to fashion the mechanical trigger system with trigger member, spring, and guide arrangement, as well as the tensioning wedge, as a module which is more or less separate from the remaining components of the switching element. To ensure that any damage or even injuries are avoided during an improper handling of this separate module, due to a trigger member which is, so to speak, fired out of the guide arrangement, the present invention provides that the movement of the trigger member is limited, when recoiling, by an abutment.

In case of a radial pin laterally projecting from the trigger member, the pin, after sliding off the tensioning wedge, can abut, for example, the guide housing of the trigger member and thus catch the latter. However, preferably, the safety of the trigger member is, instead, fashioned as a tongue-shaped extension of the tensioning wedge at its end releasing the trigger member. The maximum displacement movement of the tensioning wedge is, in turn, limited so that the recoiling trigger member can be retained by the extension of the tensioning wedge even if the latter traverses its maximum distance.

Insofar as the switching element combines in its system a mechanical and an electrical triggering function, the inner or other end of the trigger member is effective directly on a mechanical primer element arranged in the housing and which effects displacement of the actuating element. Here again, a striker pin and a percussion-sensitive or striker sensitive primer element are preferably utilized. Depending on the side of the piston-like end of the actuating element guided within the housing exposed to the thus-produced compressed gas, the actuating element can be pushed out of the housing or retracted into the housing. If additionally the primer element which can be triggered mechanically and a primer element which can be triggered electrically are constructed in such a way and are arranged within the housing such that, upon triggering of one primer element, the gases thereof effect the initiation of the other primer element, then it is possible to reduce the size of both primer elements advantageously, with the same quantity of compressed gas.

In order to be able to reuse the switching element after a triggering action has been performed, with a minimum of expenditure, the present invention provides an advantageous construction wherein the primer element which can be triggered mechanically and the one which can be triggered electrically, as well as optionally further pyrotechnical components, are accommodated in a separate, compressed-gas-generating housing section arranged between a housing section which contains the mechanical triggering arrangement and the electric lead, and a housing section which contains the actuating element, and is firmly but detachably joined with these other housing sections, for example, by means of long screws. In this case, only the part of the housing which generates the compressed gas, i.e., the pyrotechnical unit, needs to be exchanged for a new part and to be joined to the two other housing parts which can be directly returned to duty. In case of the two other housing parts, it is merely necessary to push the tensioning wedge with the trigger member and the actuating element back into their positions prior to the triggering of the function. Depending on the assembly possibilities, it is in certain cases also sufficient to exchange in the pyrotechnical unit only the primer elements and the further pyrotechnical components, which may be present, against new ones.

A particularly simple and reliable connection of the preferably two special leads for the electric primer element is provided in that the electrical primer element of the housing section producing the compressed gas is connected with the electrical lead of the other housing section by way of plug-in contacts. It is possible thereby to simply plug the pyrotechnical unit onto the housing part with the mechanical triggering arrangement, then to attach against this unit the housing with the actuating element, and then to combine the three parts with one another, for example, by means of long screws, to a unitary, compact housing.

Another advantageous combination of the switching element according to this invention is provided in that the mechanical triggering unit is coupled with a thermal unit and the trigger member of the mechanical unit is arranged and constructed so that it can overcome the locking action of a thermally sensitive spacer element. A suitable construction provides that the other end of the trigger member is effective on a spacer element arranged in the housing between a displaceable holding bearing and an abutment. This spacer element, in turn, releases the holding bearing on the one hand when a predetermined temperature has been reached and on the other hand under the effect of the trigger member so that the holding bearing, under the action of a force constantly exerted thereon, can be displaced in the direction toward the abutment and thereby releases a striker element, preferably a striker pin, so that this striker element under the force constantly effective thereon can be driven against a mechanically initiatable primer element arranged in the housing whereby this primer element, in turn, effects the displacement of the actuating element.

The temperature-sensitive spaced element can be made, for example, in the form of a rod-shaped member of specific dimensions of a metal and/or a corresponding metal alloy, e.g., Wood's alloy, which melts when a predetermined temperature has been reached. The temperature-dependent triggering action takes place, in this case, by the initial or complete melting of the spacer element when the limit temperature has been reached and exists for a certain period of time or when this limit temperature has been exceeded. Thereby, the spacer element, under the pressure of the preferably spring-loaded, displaceable holding bearing, changes its shape or is removed from the locking position so that the holding bearing can shift axially and thus release the striker element. During the mechanical triggering operation, the spacer element, by the recoiling trigger member, is deformed, destroyed, or removed from its locking position so that the holding bearing is likewise released. The striker element, thereupon released by the holding bearing, is preferably a striker pin, but could also be a broaching needle which then would act on a prestriking primer. Here again, it is possible to expel as well as retract the actuating element from and into the housing by exposing the inner end of the actuating element on the piston side to the gas in an appropriate way.

This mechanical-thermal switching element can advantageously be supplemented, if desired, by a possibility for electrical triggering by providing that the abutment of the spacer element is fashioned as a piston which can be displaced under the action of pressure in the direction toward the holding bearing and during this process overcomes the effect of the spacer element arresting the holding bearing, and that a compressed-gas-generating primer which can be triggered electrically is arranged on the side of the piston facing away from the spacer element. The counter bearing is simultaneously used, in accordance with the invention, for deforming the temperature-sensitive spacer element at a predetermined point in time, or for removing the spacer element from a position wherein it arrests the opposed holding bearing, so that the latter is released and thus, in turn, admits the movement of the biased striker element. As the compressed-gas, generating primer device, an electrical primer element with an incandescent wire is preferably provided. However, it is of course likewise possible to use a different-type electrical primer, for example, a gap or a stratified primer. Normally, the amount of gas generated by these primers is entirely sufficient for shifting the piston-like counter bearing in the desired manner with respect to the spacer element. However, it is also possible to arrange a separate, compressed-gas-generating igniter charge after the primer, if this should prove advantageous under unfavorable circumstances. In any event, a small, compact, insensitive component is obtained which can be manufactured at low expense.

To achieve an even further simplified structure, an arrangement wherein the piston is guided with its end facing away from the spacer element in a cap-shaped, cylindrical closure element receiving the primer and the closure element is connected with the housing, preferably by a threaded connection, proves to be advantageous. Preferably, the electrical primer is firmly inserted in the closure element, which latter is fashioned similar to a cap screw. Thus, after an electrical triggering action has been performed, the original closure element can simply be exchanged for a new one with a not yet triggered primer.

To be able to utilize the piston, in the rest condition, as a solid abutment for the spacer element, it is possible to hold it in the housing by way of radial shear pins or the like, which are severed only after the electrical initiation of the primer means which generates the pressure gas. However, it is more advantageous, in accordance with a further feature of this invention, to fashion the piston and the housing or closure element such that the piston has an offset portion on its cylindrical outer surface, by means of which it rests on a corresponding counter surface of the housing and/or on the annular end face of the closure element in a direction toward the primer. The offset portion is preferably fashioned as a continuous, radial shoulder. For this purpose, the closure element is, for example, preferably threadedly inserted in the housing of the switching element so that it contacts the piston with its end face and maintains the piston in the predetermined rest position.

A particularly advantageous construction of the spacer element is that of a glass vessel or ampoule with a fluid filling which destroys the vessel when a predetermined temperature has been reached. These glass ampoules, which have an essentially spherical shape, are filled with alcohol or a similar fluid, and are conventionally obtainable commercially, for example, under the name of "ESTI" cartridge, can be manufactured at low expense and react relatively quickly whenever the predetermined limit temperature, e.g., 60°, 70°, or 80° C., is exceeded to a minor extent, by rupturing due to expansion or evaporation of the fluid. In this arrangement, care must be taken by specially designing the structure of the housing receiving such ampoule, preferably by providing correspondingly large, lateral window-like apertures, that the glass fragments produced during its destruction do not unduly impede the functions, i.e., particularly the axial movement of the holding bearing.

As in the case of the switching element, which can be triggered mechanically-electrically, it is also advantageous in connection with a switching element which can be triggered by mechanical-thermal arrangement and optionally by an electrical arrangement to impart to such switching element a subdivided structure such that the housing, in the zone of the mechanically initiatable primer element, is subdivided and both parts are firmly but detachably joined together by way of a screw thread, a bayonet catch, or the like so that, after triggering of the function, the primer element and optionally additional pyrotechnical components can be recharged.

Depending on the required expulsion or retraction force of the mechanical actuating element of the switching element of this invention and the associated displacement path, there is the possibility that the amount of compressed gas produced by the customary mechanical and/or electrical primer elements is insufficient. In these cases, it is readily possible to arrange after the primer a separate igniter charge which produces gas under pressure. This igniter charge can be, for example, single-, double-, or multiple-base propellant powder, gunpowder, or a gas-producing mixture of aminoguanidine azotetrazole and additives, as described in German Patent 1,646,313. If in an individual case a time delay is required between the triggering of the switching element and the shifting of the actuating element, it is possible to interpose between the primer and the igniter charge, basically, also one of the conventional pyrotechnical delay charges, delaying the transfer of the ignition pulse to the igniter charge to the desired extent.

A particularly preferred application of the switching element of this invention is its use for opening the sealing diaphragm, sealing plate, or the like, of fire-extinguishing devices. The actuating element is fashioned as a plunger, which can be expelled and thus penetrates the closure means of the fire extinguishing devices and in this way makes it possible for the extinguishing medium to be discharged. The fire extinguishing device is, in particular, constituted by pressure bottles filled with an extinguishing medium which is under pressure. However, the switching element can also serve for the opening of valves, pipelines, or the like for different purposes, just as it can also be utilized in general for unlocking purposes or for the initiation of switching operations, control processes, power transmission operations, or the like.

These and further objects, features and advantages of the present invention will become more obvious from the following description when taken in connection with the accompanying drawings which show, for purposes of illustration only, several embodiments in accordance with the present invention; and wherein FIG. 1 is a longitudinal sectional view of an embodiment of a mechanical-electrical switching element in accordance with the present invention;

FIG. 4 illustrates in a longitudinal sectional view a mechanical-thermal-electrical switching element in accordance with the present invention.

Figure 2:
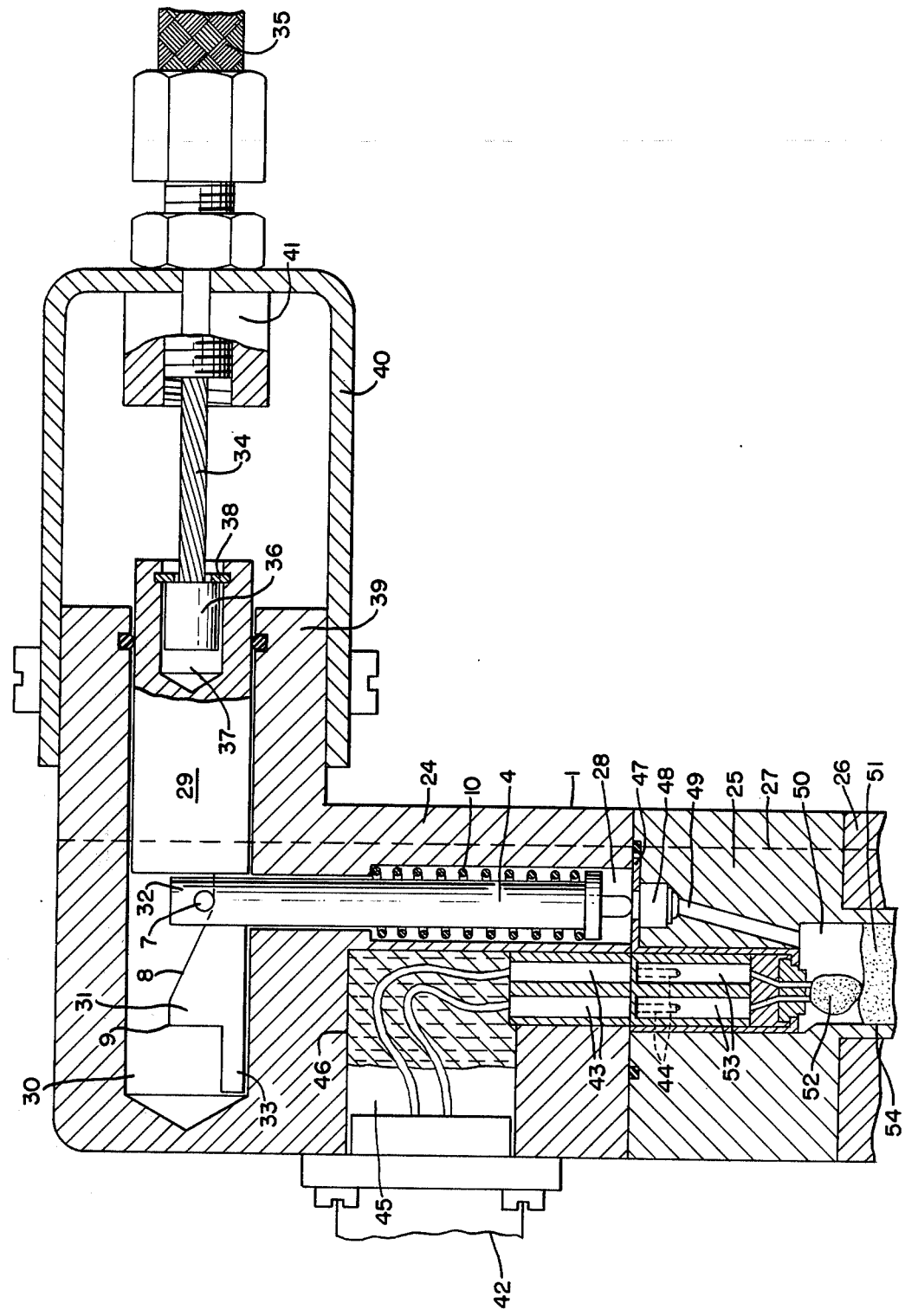
FIG. 2 shows another embodiment in accordance with the present invention.

Referring now to the drawings wherein like reference numerals are utilized to designate like parts throughout the several views, there is shown in FIG. 1 a switching element having a tubular housing 1 of, for example, a circular or square cross-section and formed, for example, of steel or a brass or aluminum alloy. A trigger member 4, in the form of a striker pin, is guided in an axial bore 2 having a closure member 3. Through utilization of a tensioning wedge 5 and a pull cord 6, the trigger member can be moved out of the axial bore, in that, upon the effect of the force F at the pull cord 6, the trigger member 4 slides with its radial pin 7 upwardly along the wedge surface 8 of the tensioning wedge 5 until it glides off the sliding edge 9. Under the effect of a coil spring 10 which is biased to an only very slight extent in the illustrated starting position, wherein it is in the rest condition, but which is correspondingly biased when the trigger member 4 is moved outwardly, the trigger member 4 then recoils and with its other end 11, which is the tip of the striker pin, strikes a percussion-sensitive primer 13 which is supported against a shoulder 12 in the bore 2 and additionally housing the primer charge which produces the gas under pressure. The pressure gases generated thereby act on the end 14 of an actuating element 15, in this case a plunger, on the piston side, which plunger is coaxially arranged in the bore 2, and push the actuating element out of the housing 1. The housing 1 is screwed onto a pressure bottle 17, only the upper part of which is shown, by way of the threaded extension 16, so that the driven-out plunger destroys the closure diaphragm 18 of the pressure bottle 17, and the fire extinguishing medium which is, for example, contained in this bottle can flow out by way of the nipple 19.

In addition to the mechanical triggering function described hereinabove, an electrical triggering arrangement is located on the side of the device. This electrical triggering arrangement includes a threaded connecting pipe 20 with a primer 21 which can be triggered electrically and having an igniter charge which generates the pressure gas. After applying an ignition voltage to the two leads 22, the primer 21 is triggered such that the pressure gases of the primer flow into the bore 2 via a transverse bore 23 and again act on the end 14 of the actuating element 15 on the piston side, so that this element is driven out of the housing. The arrangement and construction of the primers 13 and 21 are such that, after the intentional triggering of either one, the hot, compressed gases thereof destroy, for example, the cover made up of a paper lid, a synthetic resin film, or the like, of the other, not yet triggered primer and thus effect the concomitant triggering thereof.

In the modification of a mechanical-electrical switching element illustrated in FIG. 2, the housing 1 is subdivided into a section 24 accommodating the mechanical triggering arrangement and the electric lead, into a section 25 for generating the gas under pressure, and into a section 26, only partially indicated in the drawing, having the actuating element to be displaced. These three sections of the housing 1 are connected firmly but detachably by means of long screws, one of these screws being indicated by the dashed line 27.

In section 24, the trigger member 4 having the radial pin 7 and the compression spring 10 is guided within a bore 28. A tensioning wedge 29 is displaceably guided in a bore 30 arranged at right angles thereto and engages with its actual wedge portion 31 into a longitudinal slot 32 of the trigger member 4, as clearly shown in FIG. 3. Following the wedge-shaped surface 8 and the sliding edge 9, a tongue-shaped extension 33 is formed at the tensioning wedge 29. At its other, outer end, the tensioning wedge 29 is joined to the wire 34 of the Bowden cable 35 by retaining holding member 36, clipped onto the wire 34, in the bore 37 of the tensioning wedge 29 by means of a spring ring 38.

A holding bracket 40 having a lug 41 is threadedly attached to a rectangular projection 39 of the housing section 24. The spacing between the lug 41 and the outer end of the tensioning wedge 29 is limited so that, during the step of pulling out of the tensioning wedge 29, the trigger member 4 slides with its radial pin 7 along the wedge surface 8 of the wedge section 31 in the upward direction, recoils after passing the sliding edge 9 and—with the section 25 not yet connected to section 24—is pevented from shooting out of the bore 28 by the tongue-shaped extension 33.

Furthermore, section 24 includes an electrical lead, arranged on the side, with the only partially illustrated connection plug 42, the two lead 43, and plug-in contacts 44. The leads 43 are fixedly and sealingly mounted in the recess 45 by means of a sealing compound 46, for example, a two-component adhesive, such as "ARALDIT".

The section 25, which produces the pressure gas or is of a pyrotechnical nature, includes an anvil-type percussion primer cap 48 fixed in the recess of section 25 with the annular disk 47 and being arranged for association with the trigger member 4. A flash canal 49 of the primer cap leads to a housing space 50 for an additional igniter charge 51 generating compressed gas. Section 25 furthermore houses the electrical primer 52, e.g., a primer pellet, the two leads 53 of which are electrically conductively connected to the plug-in contacts 44. A sleeve-like extension 54 of section 25, surrounding the housing space 50, is shown only in its upper portion and, in the practical arrangement, is, for example, 2.5 times as long. Toward section 26, the extension 54 is sealed with a cap-shaped cover of, for example, cardboard, a synthetic resin, or also a metal foil, which can be destroyed under the effect of the pressure gases. The construction of section 26 with the actuating element 15 otherwise corresponds to the illustration shown in FIG. 1. Section 25 constitutes an independent unit which can be obtained separately from the manufacturer, for example, and stored in such condition, so that it is available at any time when necessary, i.e., after a function has been triggered, for a simple and rapid recharging of the switching element.

Figure 3:
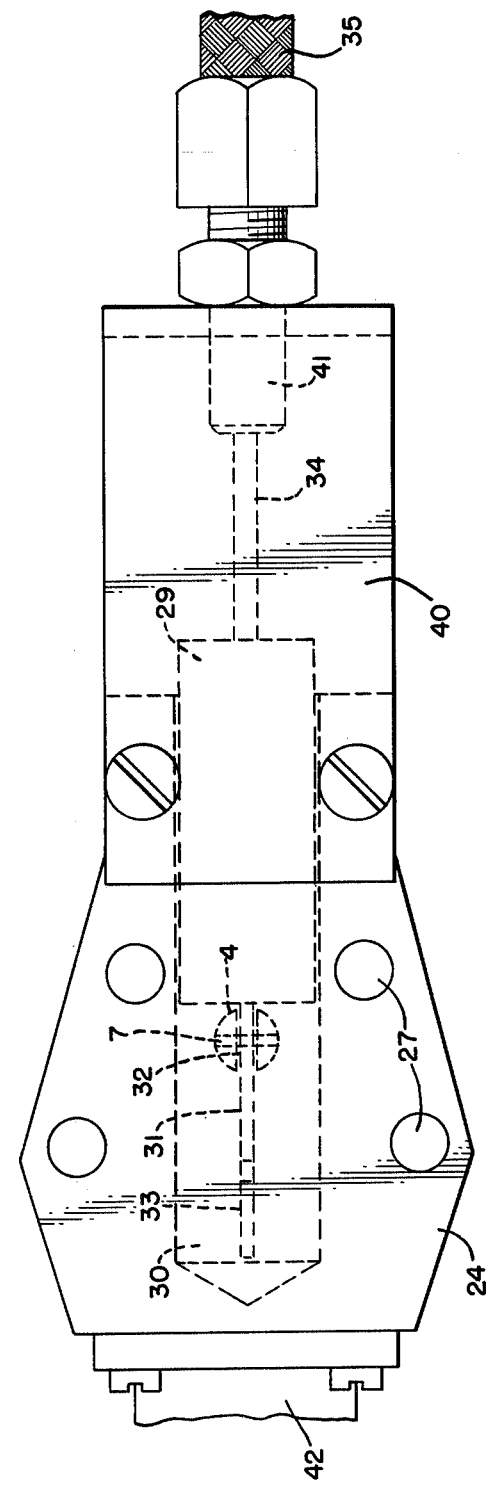
FIG. 3 is a top view of the FIG. 2 embodiment.

FIG. 3 shows the switching element in a top view with the housing section 24, the recesses for the long scrwes 27, the trigger member 4 with radial pin 7 and longitudinal slot 32, the tensioning wedge 29 with wedge section 31 and extension 33 within the bore 30, the wire 34 of the Bowden cable 35, the holding bracket 40 with limiting stop 41, as well as the connecting plug 42.

In the combined pyrotechnical switching element according to FIG. 4, a percussion element 56, in this case again a striker pin, is guided in a bore 55 of housing 1, the percussion element being under the pressure force of the biased spring 57. The percussion element 56 is provided at its upper end with a conical constriction 58 engaged by steel balls 60 resting against the surface 59 of the housing 1 and fixed in this position by means of the bell-shaped holding bearing 61 with a conical abutment surface 62, pushed over the steel balls. The holding bearing 61 is pressed, by means of a slightly biased compression spring 63, against an abutment 65, via a spacer element 64, in this case a glass ampoule filled with alcohol. The abutment 65 is, in turn, fashioned as a piston which is arranged in the threadedly connected closure member 66 of the housing 1 and/or in the cap-shaped closure element 67 which is screwed into the closure member 66, the piston rests against the shoulder 68. After triggering of the electrical primer 69 via the two leads 70, the piston 65 is shifted toward the spacer element 64 and destroys the same. Thereby, the locking action on the holding bearing 61 is overcome, so that the bearing, under the effect of the compression spring 63, is lifted off the steel balls 60 and releases the same. The steel balls 60 are thereupon pressed toward the side by the conical surface of the constriction 58, and the striker element 56 shoots toward the percussion-sensitive primer 71 and triggers the latter. The primer, in turn, then ignites the subsequently arranged primer charge 72, which produces the pressure gas. Analogously to FIG. 1, the actuating element 51 is thereafter pushed through the sealing diaphragm 18 of the pressure bottle 17.

In case of a thermal triggering action, the spacer element 64 is destroyed by expansion and/or evaporation of the alcohol and thereby again releases the holding bearing 61. The further procedure corresponds to that described above. For purposes of mechanical triggering, an arrangement is disposed laterally beside the spacer element 64, the structure and function of which corresponds to that in FIG. 1. This arrangement includes the closure member 3, the trigger member 4 with the spring 10 resting on the annular collar 73, and the radial pin 7, as well as the tensioning wedge 5 with pull cord 6, wedge surface 8, and sliding edge 9. As contrasted to FIG. 1, the trigger member 4 here is not effective on a primer element but rather effects the destruction of the spacer element 64, whereby again the holding bearing 61 is released.

Insofar as an electrical triggering action is not required, the closure element 67 with the primer device 69 and the leads 70 is unnecessary. The abutment 65 is, in this case, firmly formed in the closure member 66 of the housing 1.

To provide for a simple recharging process also in this case, after the function has been triggered, the housing 1 is subdivided in the zone of the primer 71. The two housing sections are firmly but detachably joined by way of the threaded connection 74. Advantageously, here again the primer 71 and the igniter charge 72 are arranged in a separate insert piece 75, which represents a self-contained, pyrotechnical component that can be readily exchanged for a new one.

The switching element according to the invention may be used with fire-extinguishing pressure tanks having a sealing diaphragm and provided with the same threaded connection as the switching element. It is also possible, depending on the requirements of an individual case, alternatively to utilize one of the above-explained, combined switching elements with a likewise identical connection and actuating element of a different device and for a different purpose such as opening valves, pipelines or the like or for general unlocking purposes, or for initiation of switching operations, control processes, power transmission operations or the like.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A compressed-gas-actuated switching device comprising housing means, at least one primer element for generating compressed gas, an actuating element within said housing means and being displaceable in response to generated compressed gas for actuating a device to be actuated, and triggering means for triggering the initiation of said at least one primer element, said triggering means including mechanical triggering means and at least one of an electrical and thermal triggering means.

2. A switching device according to claim 1, wherein said actuating element includes a member displaceable in said housing means and constructed as one of a bolt, pin, plunger and piston.

3. A switching device according to claim 1, wherein said actuating element effects the opening of a sealing member of a fire-extinguishing device.

4. A switching device according to claim 1, wherein said mechanical triggering means includes a trigger member having first and second ends arranged for guided movement within said housing means, means cooperating with said trigger member for biasing thereof, and tensioning wedge means, said tensioning wedge means cooperating with the first end of said trigger member and being displaceable in a first direction transverse to the direction of guided movement of said trigger member, said trigger member in response to initial movement of said tensioning wedge means being moved in a direction or enabling said cooperating means to bias said trigger member, said tensioning wedge means releasing said trigger member at a predetermined portion of the path of displacement of said tensioning wedge means for enabling said trigger member to recoil in a direction opposite to the first direction in response to the biasing force of said cooperating means and effect the mechanical initiation of said at least one primer element.

5. A switching device according to claim 4, wherein said trigger member is constructed as one of pin-shaped, bolt-shaped and needle-shaped, said tensioning wedge means including an inclined camming surface portion for cooperating with the first end of said trigger member and another surface portion for enabling release of the first end of said trigger member.

6. A switching device according to claim 4, wherein the first end of the trigger member cooperating with said tensioning wedge means is provided with a longitudinal slot and said tensioning wedge means is displaceably arranged and supported on said trigger member with a surface thereof facing away from the second end of said trigger member.

7. A switching device according to claim 4, further comprising an abutment member for limiting the movement of said trigger member during the recoiling movement thereof.

8. A switching device according to claim 7, wherein said abutment member is a tongue-shaped extension of said tensioning wedge means proximate to a surface portion of said tensioning wedge means enabling release of said trigger member, and further comprising means for limiting the displacement path of said tensioning wedge means for ensuring retention of the recoiling trigger member on the extension of said tensioning wedge means even when said tensioning wedge means moves along the entire path of displacement thereof.

9. A switching device according to claim 4, wherein said at least one primer element includes an electrically initiatable primer element and a mechanically initiatable primer element, the other end of said trigger member initiating said mechanically initiatable primer element for effecting displacement of said actuating element.

10. A switching device according to claim 9, wherein said mechanically initiatable primer element and said electrically initiatable primer element are disposed in said housing means and constructed such that upon initiation of one of said electrically and mechanically initiatable primer elements, the gases thereof effect the initiation of the other of said mechanically and electrically initiatable primer element.

11. A switching device according to claim 9, wherein said housing means includes a plurality of separate housing sections firmly and detachably connectable with one another, at least said mechanically initiatable primer element and said electrically initiatable primer element being accommodated in a compressed-gas-generating housing section, said mechanical triggering means and electrical lead means for said electrically initiatable primer element being disposed in another housing section, and said actuating element being disposed in a further housing section, said compressed-gas-generating housing section being firmly and detachably connected to and between said another and further housing sections.

12. A switching device according to claim 11, further comprising means for firmly and detachably connecting said housing sections with one another.

13. A switching device according to claim 11, wherein said compressed-gas-generating housing section further includes pyrotechnical means for additional gas generation.

14. A switching device according to claim 11, further comprising plug-in contact means for enabling connection of said electrical primer element of said compressed-gas-generating housing section with said electrical lead means of said another housing section.

15. A switching device according to claim 4, further comprising a displaceable holding means and an abutment means arranged within said housing means, spacer means being disposed between and spacing said displaceable holding means and said abutment means, said displaceable holding means holding a primer initiator member and being biased against said spacer means in the direction toward said abutment means, said spacer means being responsive to the exceeding of a predetermined temperature for enabling displacement of said displaceable holding means toward said abutment means for enabling release of said primer initiating member to effect initiation of a mechanically initiatable primer element and therewith the displacement of said actuating element, the second end of said trigger member being effective on said spacer means to enable displacement of said displaceable holding means in response to a mechanical triggering action.

16. A switching device according to claim 15, wherein said spacer means is a container with a fluid filling for destroying the container upon exceeding the predetermined temperature.

17. A switching device according to claim 15, wherein said housing means in the zone of said mechanically initiatable primer element is subdivided into two housing sections, said two housing sections being firmly and detachably connected for enabling at least replacement of said mechanically initiatable primer element after triggering of said actuating element.

18. A switching device according to claim 17, further comprising means for detachably joining said housing sections.

19. A switching device according to claim 15, wherein said abutment means is constructed as a piston means displaceable within said housing means in the direction towards said displaceable holding means so as to overcome the separating effect of said spacer element means, and an electrically initiatable primer element being arranged on the side of said piston means facing away from said spacer means for generating compressed gas to effect displacement of said piston means toward said displaceable holding means upon electrical initiation thereof and therewith enable displacement of said displaceable holding means.

20. A switching device according to claim 19, further comprising a cap-shaped cylindrical closure member connected with said housing means for receiving said electrically initiatable primer element, said piston means being guided with the end thereof facing away from said spaced means in said closure member.

21. A switching device according to claim 20, wherein said piston means has a cylindrical outer surface with a shoulder portion arranged for abutment with at least one of a corresponding counter surface of said housing means and an annular end face of said closure member in a direction toward said electrically initiatable primer element.

22. A compressed-gas-actuated switching device comprising housing means, means for generating compressed gas within the housing means, an actuating element disposed within the housing means and associated with the means for generating compressed gas, the actuating element being displaceable for actuating a device to be actuated in response to the compressed gas generating means generating compressed gas, and triggering means for triggering the initiation of the compressed gas generating means to generate compressed gas, the triggering means including mechanical triggering means and at least one of an electrical and thermal triggering means.

23. A switching device according to claim 22, wherein the mechanical triggering means and the thermal triggering means are operable independently of an electrical supply means for the electrical triggering means.

24. A switching device according to claim 23, wherein the actuating element includes a member displaceable in the housing means and constructed as one of a bolt, pin, plunger and piston.

25. A switching device according to claim 24, wherein the displaceable member effects the opening of a sealing member of a first extinguishing device.

* * * * *